United States Patent Office 3,558,717
Patented Jan. 26, 1971

3,558,717
STABLE FORMALDEHYDE PRODUCT AND
PROCESS FOR PREPARING IT
Kurt Theurer, Petersburg, Va., assignor to Allied Chemical Corporation, New York, N.Y., a corporation of New York
No Drawing. Continuation-in-part of application Ser. No. 295,215, July 15, 1963. This application May 11, 1967, Ser. No. 637,618
Int. Cl. C07c 47/04
U.S. Cl. 260—606      4 Claims

ABSTRACT OF THE DISCLOSURE

A process for stabilizing essentially methanol free aqueous formaldehyde solution against polymer precipitation and acidic increase utilizing additives from the group consisting of hydroquinone, hydroquinone monomethylether, 2,6-di-tert-butyl-4-methyl phenol, 2-tert-butyl-4-hydroxyanisole and 3-tert-butyl-4-hydroxyanisole. All of these additives cause color change in the formaldehyde solution with the exception of 2,6-ditertiary butyl-4-methyl phenol.

---

This invention relates to a process for the stabilization of essentially methanol free aqueous formaldehyde solutions against acid formation, particularly when stored for substantial periods at elevated temperatures, and the resultant solutions therefrom.

RELATED APPLICATIONS

This invention is a continuation-in-part application of copending application Ser. No. 295,215, filed July 15, 1963 now abandoned.

BACKGROUND OF INVENTION

Aqueous solutions of formaldehyde undergo a number degradative changes when stored for substantial periods of time. The principal changes which may take place on storage are (1) polymerization and precipitation of the polymer and (2) formation of formic acid, either by the Cannizzaro reaction or by air oxidation, or by oxygen present in the solution.

Acid formation is usually not a serious problem if the formaldehyde solution is stored for short periods at normal room temperatures. However, acid formation increases rapidly with increased temperatures. Polymer precipitation can be prevented by maintaining the formaldehyde solutions at elevated temperatures above the minimum temperature at which precipitation takes place for the particular formaldehyde concentration. This temperature is higher for the higher formaldehyde concentrations. For example, a 37% low methanol formaldehyde will not precipitate polymer if kept at 21° C. for 1 day, at 27° C. for 25 days or at 32° C. for sixty days. A 50% solution will remain clear for about 25 days at 55° C. Acid formation therefore is particularly troublesome for solutions of 37% to 70% or higher, which contain little or no methanol (which is a stabilizer against precipitation) and must be kept at elevated temperatures to prevent precipitation of polymer. Concentrated formaldehyde solutions, i.e. those of about 37% or higher, and especially those of above 50% concentration, are therefore usually stored at temperatures of about 60°–65° C. to insure clarity and lack of precipitation of polymer for at least about a three-week period (21 days) which is usually amply sufficient to permit time for short storage periods at the supplier's warehouse, during shipping, and by the consumer prior to eventual use.

The quantity of formic acid normally present in freshly prepared formaldehyde solutions is very small, often less than 0.02%. However, the utility of formaldehyde for certain uses, for example in the production of urea-formaldehyde resins, is dependent on maintaining the formic acid content exceedingly low, preferably less than about 0.07%.

Formaldehyde solutions have been stabilized in the past against acid formation during storage by the addition thereto of phosphoric acid and water soluble phosphates. However, the presence of phosphates in formaldehyde solutions is undesirable in certain end uses of the formaldehyde, notably in the manufacture of urea-formaldehyde resins.

Another method of stabilizing formaldehyde solutions against acid development, is by the addition thereto of aliphatic hydroxy-, amino-, and hydroxyamino acids together with hexamethylene tetramine. This method has the disadvantage that formaldhyde solutions so treated are not stable when stored in the presence of air.

SUMMARY

An object of the present invention is to produce essentially methanol free aqueous solutions of formaldehyde that have an increased stability against acid formation when stored over a period of time at elevated temperatures in the presence or absence of air.

A further object of the invention is to produce essentially methanol free aqueous solutions which have increased stability against acid formation, polymer precipitation, color change and which are free from additives which interfere with the preparation of urea-formaldehyde resins.

STATEMENT OF INVENTION

These and other objects are accomplished according to my invention by adding to aqueous solutions of formaldehyde containing between about 30% and about 70% by weight of formaldehyde, about 5–50 parts per million parts by weight of the formaldehyde solution, effective to prevent an acidity increase on storage at elevated temperatures above about 50° C. of a compound consisting essentially of hydroquinone; hydroquinone monomethyl ether; 2,6-ditertiarybutyl-4-methyl phenol; 3-tertiary butyl-4-hydroxyanisole and 2-tertiary-butyl-4-hydroxyanisole, or mixtures thereof.

DESCRIPTION OF PREFERRED EMBODIMENTS

The stabilizer compounds of my invention have the following formulas:

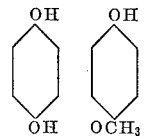      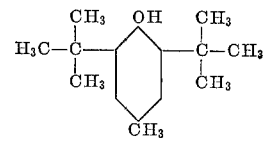

I Hydroquinone    II Hydroquinone monomethyl ether    III 2,6-ditertiary butyl-4-methyl phenol

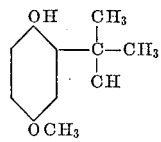      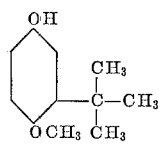

IV 3-tertiary butyl-4-hydroxy anisole      V 2-tertiary butyl-4-hydroxy anisole

The quantity of stabilizer required is extremely small, amounts of as low as about 5 parts per million or less resulting in effective inhibition of acidity development in many cases. Usually quantities between about 5 parts and about 50 parts per million parts of aqueous formaldehyde solution are sufficient. Larger quantities do no harm as far as stability of the formaldehyde solution is concerned. However, as it is always desirable to keep extraneous materials in the formaldehyde solution at a minimum, the smallest effective quantity is usually preferred. One of the outstanding advantages of the stabilization process of my invention is that it introduces only minute quantities of impurities into the resulting formaldehyde solution, i.e. as little as 5 p.p.m. or less, equivalent to only 0.0005%. Usually I prefer to introduce sufficient stabilizer to limit the acidity of the solution on storage at 65° C. for a period of about a week to not more than about .03% and for a period of about two weeks, to not more than about 0.07%.

The following specific examples further illustrate the invention.

EXAMPLES 1–5

A freshly prepared aqueous solution of formaldehyde containing about 53% formaldehyde and 0.01% formic acid was divided into samples of substantially equal volume. To different samples were added 5, 10, 15 and 25 p.p.m. of the stabilizing compounds to be tested. To control samples containing 0.012 wt. percent formic acid, nothing was added. All samples were stored under air at 65° C. after which the content of formic acid was determined.

Results are shown in the table below.

The proportions of stabilizers indicated in the tables provide control of acidity at 65° C. below 0.07% formic acid for periods of a month or more in all cases except 2,6-di-tert-butyl-4-methyl phenol which provides such control for approximately 2 weeks which is adequate for most practical purposes.

EXAMPLE 7

A freshly prepared aqueous solution of formaldehyde containing 37% formaldehyde, 0.01% formic acid, and having an APHA color less than 5 was divided into samples of substantially equal volume. To different samples were added 10, 15 and 25 p.p.m. of the stabilizing compounds to be tested. To control samples, nothing was added. All samples were stored under air at 65° C. for six weeks, after which the color was determined by the American Public Health Association (APHA) procedure as follows:

The solution is cooled near room temperature and placed in a Hellige Aqua Tester for color measurement in APHA numbers. The APHA number is determined by comparing the color liquid in a test cylinder with the color of standard colored disks. The APHA number given to the liquid in the test cylinder is that of the standard disk which it matches. Results are shown in Table III below.

TABLE I

[Acidity development in 53% formaldehyde solutions stored at 65° C. for 23 days]

| | | | Percent acid | | |
|---|---|---|---|---|---|
| Example No.: | Concentration, p.p.m. | Stabilizer name | Start | 23 days | Difference |
| 1 | None | None | .012 | .366 | .354 |
| 2 | 5 | Tenox BHA (mixture of 3-tert-butyl-4-hydroxy-anisole and 2-tert-butyl-4-hydroxyanisole). | .012 | .049 | .037 |
| | 10 | | .012 | .035 | .023 |
| | 15 | | .012 | .033 | .021 |
| | 25 | | .012 | .038 | .026 |
| 3 | 10 | Tenox BHT (2,6-di-tert-butyl-4-methyl phenol). | .012 | .197 | .185 |
| 4 | 5 | Tecquinol (hydroquinone, technical grade). | .012 | .049 | .037 |
| | 10 | | .012 | .042 | .030 |
| | 15 | | .012 | .049 | .037 |
| | 25 | | .012 | .046 | .034 |
| 5 | 10 | Hydroquinone monomethylether. | .013 | .045 | .032 |
| | 15 | | .013 | .042 | .029 |
| | 25 | | .013 | .049 | .036 |

EXAMPLE 6

Acidity tests similar to those described in the foregoing examples were carried out on a series of equal volume samples of a 53% formaldehyde solution, each containing 10 parts per million of 2,6-di-tertiary butyl-4-methyl phenol as stabilizer. Tests were made immediately upon addition of stabilizer and at intervals of storage up to 14 days with results shown in Table II below.

TABLE II

Acidity development in 53% formaldehyde solutions containing 10 p.p.m. 2,6-di-tertiary butyl-4-methyl phenol stored at 65° C.

| Storage period, days | Acidity, weight percent |
|---|---|
| 0 | 0.012 |
| 1 | .014 |
| 4 | .023 |
| 6 | .028 |
| 8 | .037 |
| 12 | .061 |
| 14 | .073 |

TABLE III

[Color of formaldehyde solution stored at 65° for 42 days]

| Concentration, p.p.m. | Acidity stabilizer added, name | APHA color at 42 days |
|---|---|---|
| 10 | Tenox BHA (mixture of 3-tert-butyl-4-hydroxy-anisole and 2-tert-butyl-4-hydroxyanisole). | 10. |
| 15 | | 20. |
| 25 | | More than 30. |
| 10 | Tenox BHT (2, 6-di-tert-butyl-4-methyl phenol). | Less than 5. |
| 15 | | |
| 25 | | |
| 10 | Tecquinol (hydroquinone, Technical grade). | Between 5 and 10. |
| 15 | | Between 10 and 15. |
| 25 | | More than 15. |
| 10 | Hydroquinone monomethylether | 5. |
| 15 | | Between 5 and 10. |
| 25 | | 10. |
| None | None | Less than 5. |

It is apparent from Table III that, in addition to the numerous advantages hereinbefore discussed, there was no color formation in the formaldehyde solutions containing 2,6-di-tert-butyl-4-methyl phenol. The retention of a clear solution after storage for an extended period of time coupled with the prevention of an acidic formation was most desirably obtained with 2,6-di-tert-butyl-4-methyl phenol.

While the above describes the preferred embodiments of my invention, it will be understood that departures may be made therefrom within the scope of the specification and claims.

I claim:

1. A process of concomitantly (1) preventing polymer precipitation (2) substantially preventing acidity increase over at least a six week period to not more than about 0.07% and (3) retaining the clear color of an essentially methanol free formaldehyde solution containing about 30% to about 70% by weight of formaldehyde, which comprises, storing said formaldehyde solution at a temperature of above about 50° C. in the presence of about 5-50 parts per million parts, by weight of the formaldehyde solution, of 2,6-di-tertiary butyl-4-methyl phenol.

2. The process, according to claim 1, wherein the formaldehyde concentration is about 40% to about 60% by weight of formaldehyde and the 2,6-tertiary butyl-4-methyl phenol is about 10 parts per million parts by weight of the formaldehyde.

3. A stable aqueous solution of essentially methanol free formaldehyde containing between about 30% to about 70% by weight of formaldehyde, and about 5-50 parts per million parts, by weight of the formaldehyde, of 2,6-di-tertiary butyl-4-methyl phenol, effective to (1) prevent polymer precipitation (2) substantially prevent acidity increase and (3) permit the solution to maintain its original clear color.

4. An aqueous solution according to claim 3 wherein the formaldehyde concentration is about 40% to about 60% by weight of formaldehyde and the 2,6-di-tertiary butyl-4-methyl phenol is about 10 parts per million parts by weight of the formaldehyde.

References Cited

UNITED STATES PATENTS

| | | | |
|---|---|---|---|
| 3,162,514 | 12/1964 | Roelen et al. | 260—601X |
| 2,886,493 | 5/1959 | Mecorney et al. | 260—601X |
| 2,488,363 | 11/1949 | Yates | 260—606 |

FOREIGN PATENTS

| | | | |
|---|---|---|---|
| 790,380 | 2/1958 | Great Britain | 260—598 |

OTHER REFERENCES

Walker, Formaldehyde, 2nd ed., pp. 75–76, 1953.

BERNARD HELFIN, Primary Examiner

R. H. LILES, Assistant Examiner